Aug. 28, 1962 D. T. AYERS, JR 3,051,530
FLUID PRESSURE OPERATED BRAKE MECHANISM
Filed April 6, 1959 4 Sheets-Sheet 1

INVENTOR
DAVID T. AYERS JR.

BY *John V. Phillips*

ATTORNEY

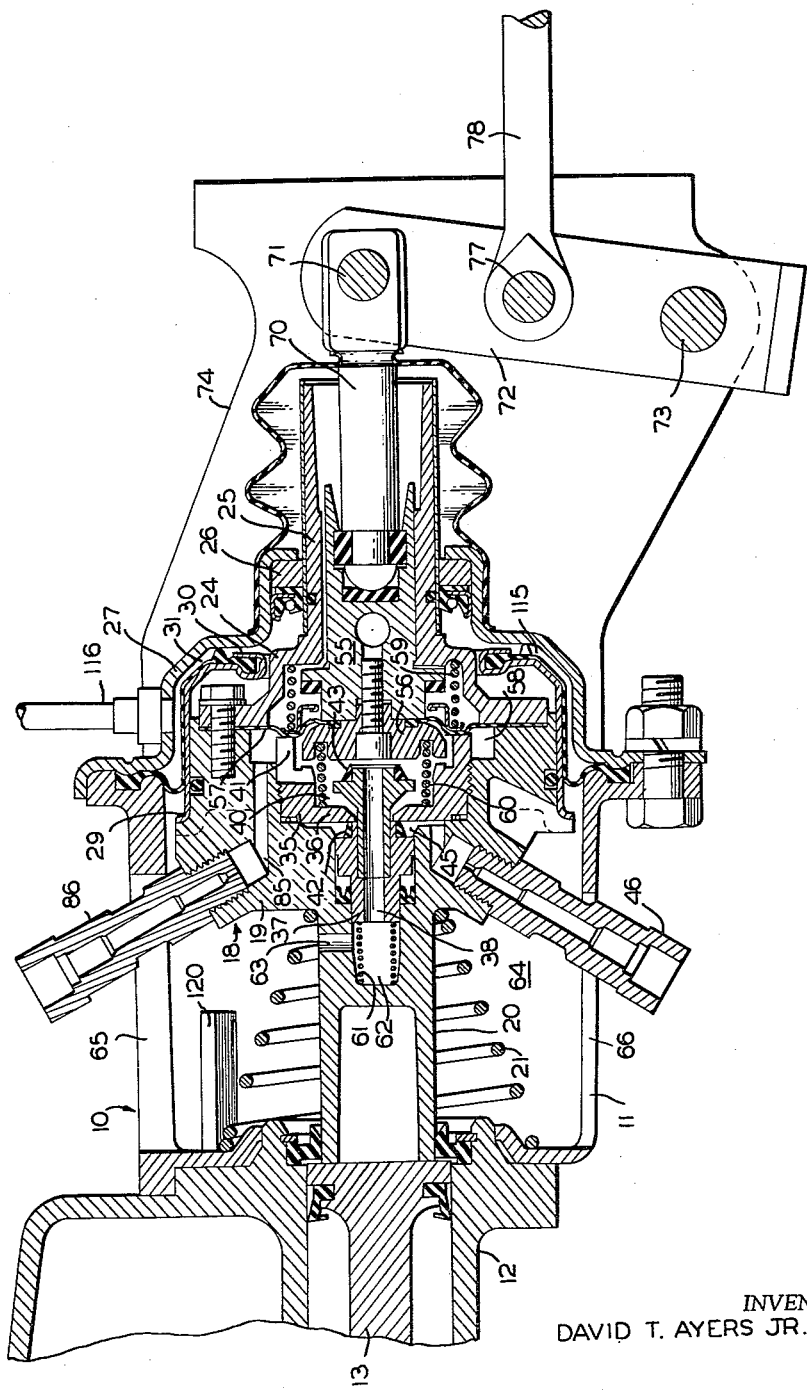

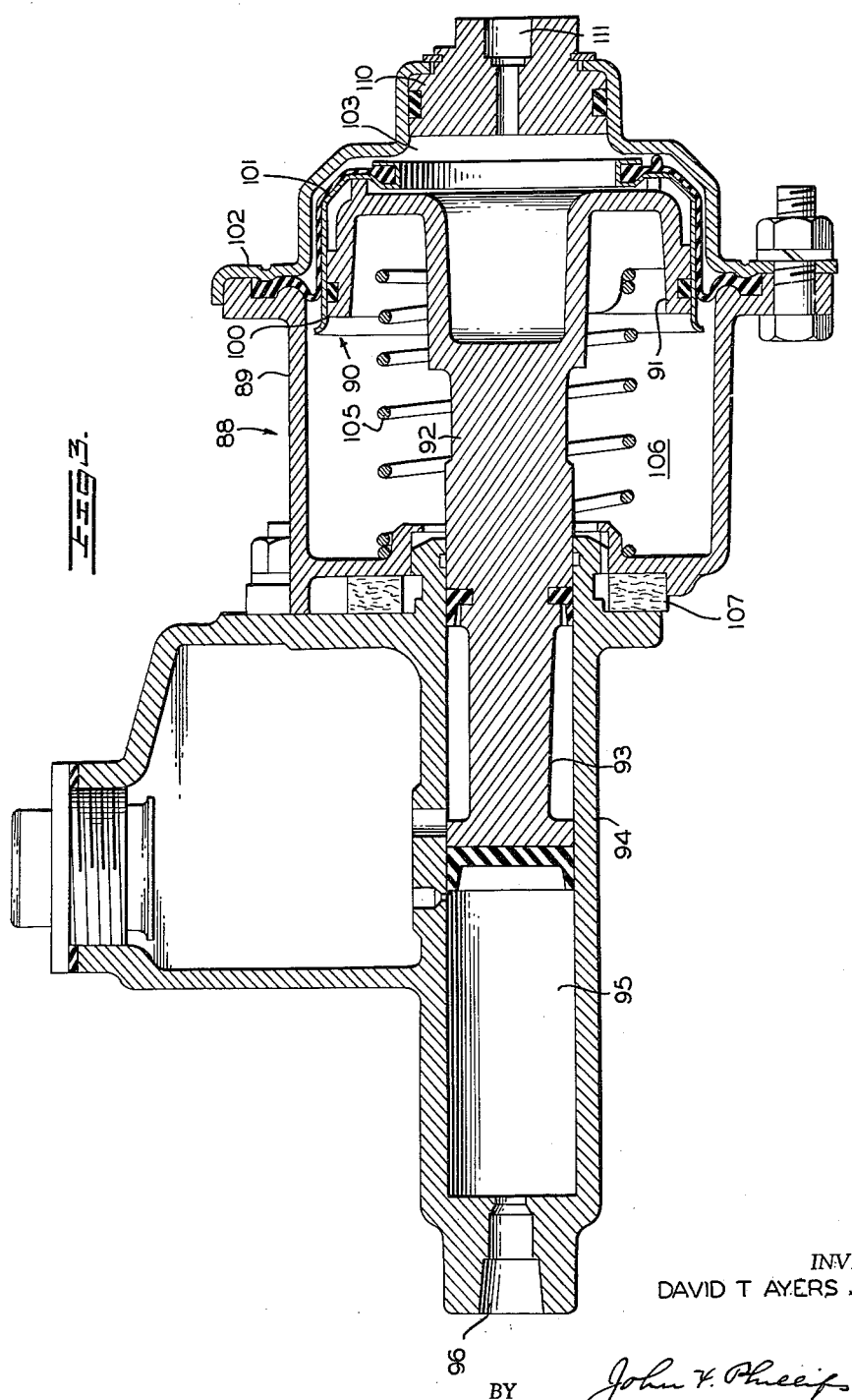

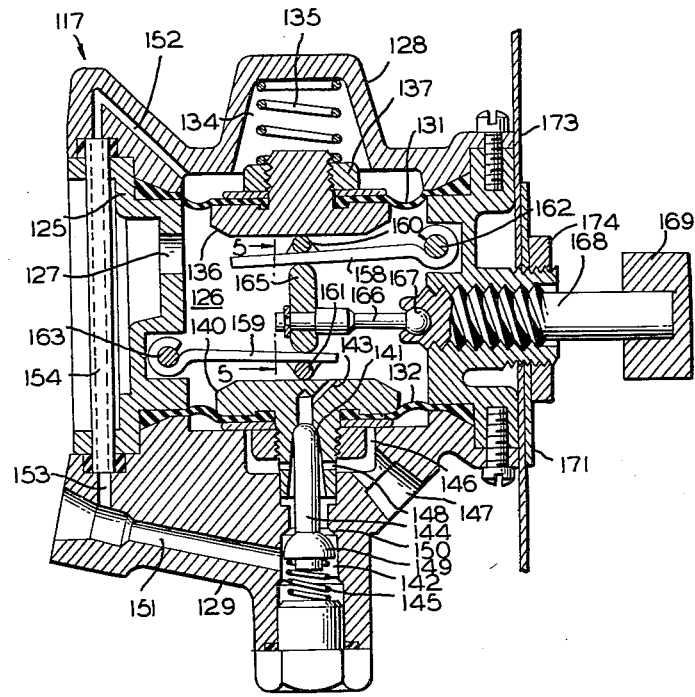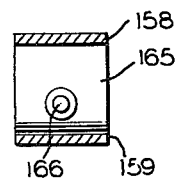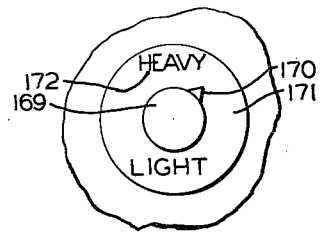

United States Patent Office 3,051,530
Patented Aug. 28, 1962

3,051,530
FLUID PRESSURE OPERATED BRAKE MECHANISM
David T. Ayers, Jr., Birmingham, Mich., assignor to Kelsey-Hayes Company, Detroit, Mich., a corporation of Delaware
Filed Apr. 6, 1959, Ser. No. 804,486
5 Claims. (Cl. 303—6)

This invention relates to a fluid pressure operated brake mechanism, particularly for use on heavier vehicles such as trucks.

In the copending application of Edward Govan Hill, Serial No. 802,349, filed March 27, 1959, there is disclosed a booster mechanism or system particularly intended for use on passenger cars. Such mechanism comprises a master motor which operates a master cylinder to displace fluid into the front wheel brake cylinders of the vehicle, assisted under certain conditions by pedal forces generated by the operator. The master motor has fluid connection with a slave motor operating a master cylinder to displace fluid into the rear wheel cylinders, the rear brakes being applied solely by the pressure generated by the slave motor under the control of a follow-up valve mechanism arranged in the master motor and controlled by the brake pedal. Such system is highly efficient for use with passenger vehicles since it provides for substantially greater braking forces at the front wheels due to the use of pedal assistance in applying the front wheel brakes. In the system referred to, reaction means is connected to the brake pedal to react thereagainst in accordance with fluid presures in the master motor, which pressures are also automatically supplied to the slave motor.

An important object of the present invention is to provide a fluid presure operated brake system having general charcteristics of the system of the copending application referred to, except that it is particularly adapted for use on heavier vehicles, the master motor and associated parts serving to apply the rear brakes, and the slave motor, the front brakes, and to provide means subject to control by the operator for variably reducing the power generated by the master motor to limit the application of the rear brakes when the vehicle is relatively lightly loaded.

A further object is to provide such a system wherein the follow-up valve mechanism of the master motor controls the pressures supplied to the slave motor and controls also the pressures supplied to the master motor except as such pressures may be reduced by the means provided for this purpose, and to utilize the reaction means for opposing pedal forces in accordance with pressures supplied to the slave motor regardless of how such pressures may be reduced in being supplied to the master motor.

A further object is to provide a system of the general charcter referred to, wherein the master motor is provided with a pressure responsive unit having a follow-up control valve mechanism therein which functions to admit pressure to an internal chamber in the pressure responsive unit, which chamber is piped to the slave motor to supply pressures thereto in accordance with operation of the follow-up valve, and to provide a conduit connecting such internal chamber with the pressure chamber of the master motor, with a pressure control valve in such conduit adjustable by the vehicle operator to effect a reduction in the pressure supplied to the master motor by follow-up valve operation without affecting the operation of the slave motor or the reaction transmitted to the brake pedal by operation of the follow-up valve mechanism, thus providing a system which is particularly adapted for use on heavy vehicles and capable of adjustment to increase or reduce the braking at the rear truck wheels in accordance with load conditions.

Other objects and advantages of the invention will become apparent during the course of the following description.

In the drawings I have shown one embodiment of the invention. In this showing:

FIGURE 2 is an enlarged axial sectional view through the master motor and associated parts;

FIGURE 3 is a similar view of the slave motor;

FIGURE 4 is an enlarged sectional view through an auxiliary pressure control valve for controlling pressures supplied to the master motor;

FIGURE 5 is a detail sectional view on line 5—5 of FIGURE 4; and

FIGURE 6 is a fragmentary face view of the control knob and associated parts of the auxiliary valve mechanism.

Figure 1:
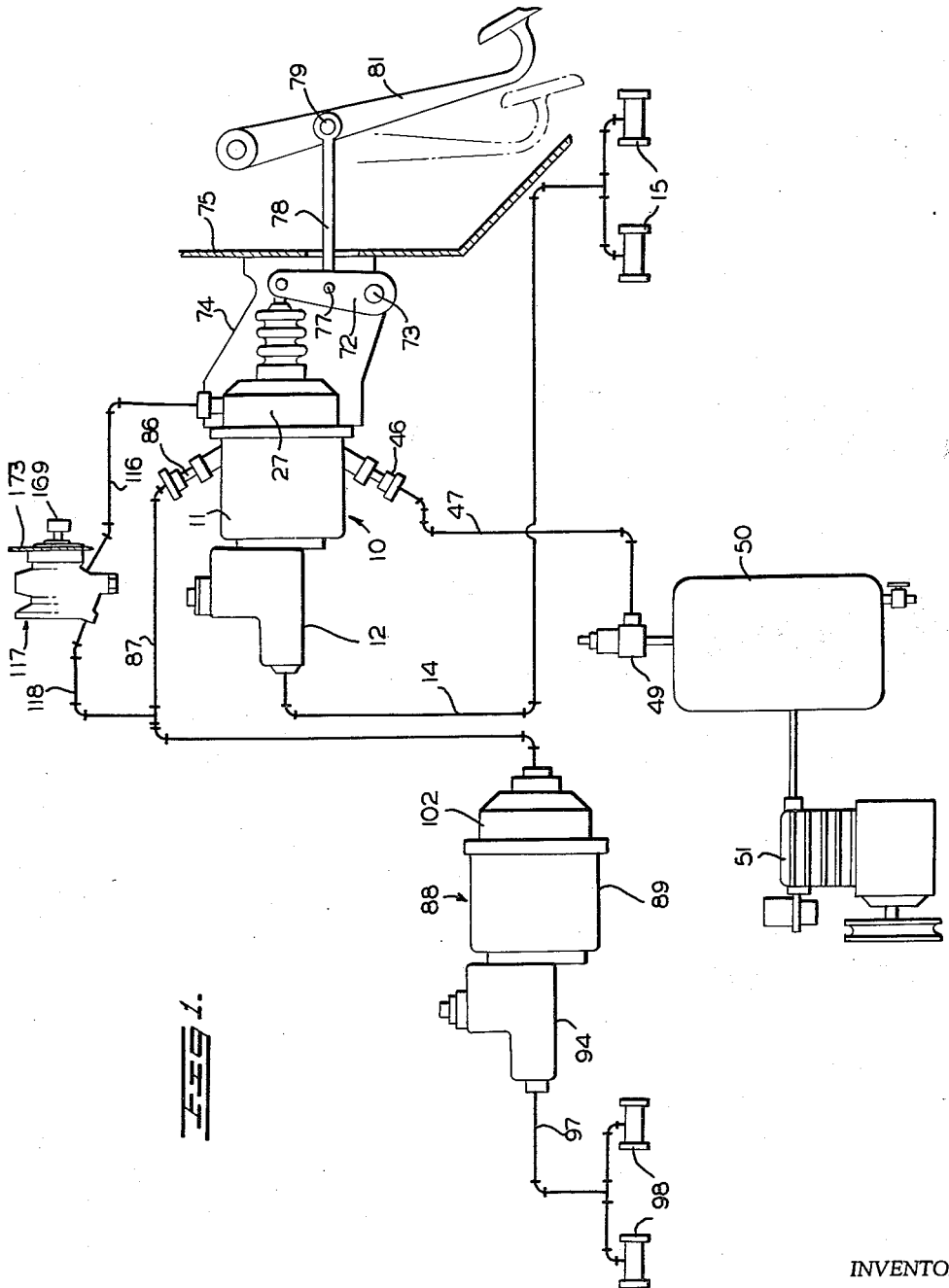
FIGURE 1 is a diagramatic view showing the entire system.

Referring to FIGURE 1, the numeral 10 designates a master motor as a whole, shown in detail in FIGURE 2. The master motor comprises a generally cylindrical body 11 against one wall of which is fixed in any suitable manner a master cylinder 12 having a plunger 13 therein for displacing fluid through lines 14 to the rear wheel brake cylinders 15 of the truck or other heavy vehicle.

The motor 10 is provided with a pressure responsive unit 18 having a preferably cast body 19 provided with an axial extension 20 abutting the master cylinder piston 13 to transmit force thereto. The pressure responsive unit is biased to its off position shown in FIGURE 2 by a return spring 21.

The pressure responsive unit 18 further comprises a cap member 24 having an axial sleeve portion 25 projecting rearwardly and slidable in a combined sealing and bearing unit 26 carried by a second housing member 27 of the master motor.

A preferably pressed-steel shell 29 is carried by the body 19 and shaped as shown in FIGURE 2. This shell is crimped as at 30 over the inner peripheral bead of a diaphragm 31, the outer peripheral bead of which is clamped between the housing members 11 and 27. This diaphragm of course forms a part of the pressure responsive unit of the motor and is of the rolling type, as will be obvious.

A nut 35 is threaded in the body 19 and has an inwardly extending flange 36 serving as a valve seat in a manner to be described. A two-part valve body 37 is slidable in the body 19 and has a bore 38 extending therethrough and normally communicating at its rear end with a control chamber 40.

The valve body 37 is provided with a pair of preferably resilient valve elements 42 and 43, the former of which normally engages the flange 36 to close communication between the chamber 40 and a pressure chamber 45 to which, in the present instance, superatmospheric pressure is constantly supplied through a connector 46. This connector (FIGURE 1) is connected by a line 47 to a pressure regulating valve 49 connected to a pressure reservoir 50. This reservoir is maintained charged with superatmospheric pressure through the operation of a conventional reservoir 51.

An axially manually operable member 55 is mounted in the pressure responsive unit. A cap member 56 is secured to the member 55 and fixes in position with respect thereto a reaction diaphragm 57. The outer portion of this diaphragm is clamped between the body members 19 and 24 of the pressure responsive unit and forms to the left thereof a chamber 58 which forms, in effect, a part of the control chamber 40, communicating therewith through notches 41 in the nut 35. The surrounding flange of the nut 35 in which the notch 41 is cut acts as a stop to limit movement of the adjacent portion of the diaphragm 57 toward the left. The diaphragm 57 is biased to such position by a spring 59 while the members 55 and 56 are biased to the right by a spring 60.

It will be noted that the valve 43 is normally spaced from the cap member 55, the latter serving as a seat for the valve 43 upon operation of the valve mechanism in a manner to be described. The valve body 37 and its valves 42 and 43 are biased to the right to the positions shown in FIGURE 2 by a spring 61. The spring 61 is arranged in a chamber 62 communicating with the bore 38 and communicating through a passage 63 with the space 64 within the motor housing 11. Such space is open to the atmosphere through longitudinal slots 65 and 66 formed in the housing 11. The connector 46 is movable in the slot 66, as will be apparent.

The manually operable member 55 is connected in any suitable manner to a push rod 70. The rod 70 is pivoted as at 71 to a pair of parallel levers 72, pivotally supported as at 73 by the side walls of a bracket 74 fixed to the housing member 27 and serving to support the master motor and associated elements relative to the fire wall 75 (FIGURE 1) of the vehicle. The levers 72 are pivotally connected as at 77 to a push rod 78 which, in turn, is pivotally connected as at 79 (FIGURE 1) to a preferably depending brake pedal 81.

The chamber 58 (FIGURE 2) communicates through a passage 85 with a connector 86, similar to the connector 46, and movable longitudinally in the slot 65. The connector 86 (FIGURE 1) is connected to one end of a fluid line 87 leading to a slave motor indicated as a whole by the numeral 88 and shown in detail in FIGURE 3. Such motor comprises a generally cylindrical housing 89 in which is arranged a pressure responsive unit indicated as a whole by the numeral 90 and comprising a preferably cast body 91 having an axial extension 92 terminating in a fluid displacing plunger 93. This plunger operates in a master cylinder 94 having the usual pressure chamber 95 connected through a port 96 to lines 97 leading to the front vehicle wheel cylinders 98. It will be noted that both master cylinders 12 and 94 are provided with conventional reservoirs, which need not be referred to in detail.

The pressure responsive unit 90 further comprises a pressed-steel shell 100 around which is arranged a rolling diaphragm 101 having its inner end secured to the shell 100. The outer periphery of this diaphragm is secured in position by a motor cap member 102 forming with the pressure responsive unit a pressure chamber 103. The pressure responsive unit 90 is biased to the off position shown by a return spring 105 arranged in an atmospheric chamber 106 communicating with the atmosphere through an air cleaner 107.

The motor cap member 102 is provided with an axial fitting 110 having a passage 111 communicating with the other end of the line or conduit 87, previously described. It will be obvious that when fluid is supplied through the line 87 to the chamber 103, the pressure responsive unit 90 will be actuated to displace fluid into the front wheel cylinders 98.

The motor housing member 27 (FIGURE 2) forms with the pressure responsive unit of the master motor a pressure chamber 115 communicating with one end of a pipe 116 leading to an auxiliary valve mechanism 117 described below. From such valve mechanism a pipe 118 leads to and is tapped into the pipe 87. It will become apparent that operation of the valve mechanism supplies fluid under pressure to the slave motor through the line 87 and to the master motor chamber 115 through line 118, valve mechanism 117 and pipe 116 to actuate the pressure responsive unit 18. Beyond the normal limit of movement of such unit, the housing member 11 is provided with a stop member 120 for a purpose to be described.

One type of valve mechanism 117 is shown in FIGURE 4. Such valve mechanism comprises a body 125 having an internal chamber 126 open to the atmosphere as at 127. Cap members 128 and 129 are secured against the top and bottom of the body member 125 and serve to secure in position with respect thereto diaphragms 131 and 132.

The cap member 128 is provided therein with a pressure chamber 134 in which is arranged a spring 135. The diaphragm 131 carries a head 136 secured in position by a nut 137 which is engaged by the spring 135 to bias the diaphragm 131 downwardly.

The diaphragm 132 carries a head 140 having a valve seat 141 controlling communication between a chamber 142 and port means 143 leading to the atmospheric chamber 126. A stem 144 normally engages the seat 141 and is biased upwardly by a spring 145.

Beneath the diaphragm 132 is a chamber 146 communicating through a port 147 with the pipe 116. This chamber communicates with the interior of the stem of the head 140 and thus with the chamber 142 through ports 148. The stem 144 carries a valve 149 normally disengaged from its seat 150 for a purpose to be described. The chamber 142 communicates through a passage 151 with the pipe 118. The cap members 128 and 129 are provided with passages 152 and 153 communicating respectively with the chamber 134 and passage 151, and the passages 152 and 153 communicate with each other through a tubular member 154.

Relatively wide levers 158 and 159 are arranged in the chamber 126 and are provided respectively with bars 160 and 161 engaging respectively against the heads 136 and 140. These levers are respectively pivotally supported as at 162 and 163.

A substantially square fulcrum block 165, preferably having rounded edges as shown in FIGURE 4, is mounted between and contacts with the levers 158 and 159. The fulcrum block is carried by a stem 166 having swivel connection as at 167 with a screw stem 168 threaded through the body 125. The threads of this stem are preferably doubled or tripled so that one complete revolution of the stem 168 will move the fulcrum block 165 to its limit of movement to the left away from the normal position shown in FIGURE 3. The stem 168 carries a knob 169 which may have a pointer 170 operating over a scale 171 bearing suitable legends or indicia 172. The valve device 117 is secured to the instrument panel 173 of the vehicle by a nut 174 which serves to fix in position the member 171.

The specific form of the valve mechanism 117 forms no part per se of the present invention but is disclosed and claimed in the copending application of William Stelzer, Serial No. 802,834, filed March 30, 1959. The general type of motor shown in FIGURE 2 is disclosed and claimed in the copending application of David T. Ayers, Jr., Serial No. 747,424, filed July 9, 1958, now Patent No. 2,953,120. The master motor is claimed in the present application only with respect to the changes therein which have been made over the copending application of David T. Ayers, Jr., referred to.

Operation

The parts of the master and slave motors normally occupy the positions shown in FIGURES 2 and 3. The parts of the auxiliary valve mechanism are shown in FIGURE 4 in the positions they will occupy when such valve mechanism does not affect the energization of the motor 10 so that the pressure chamber 115 of such motor will be subjected to the same pressures as the slave motor, as further described below.

When the brakes are to be operated, the brake pedal 81 will be depressed and will transmit movement through the rod 78 to the lever device 72 (FIGURE 2) to move the rod 70 and member 55 to the left of the position shown in FIGURE 2. Initial movement of the head 56 will engage such element with the valve 43, thus disconnecting the chamber 40 from the atmosphere with which it normally is connected through the bore 38, chamber 62, port 63, and atmospheric chamber 64. This movement takes place solely against the resistance of the spring 60. Slight further movement of the brake pedal will effect movement of the valve body 37 to the left to "crack" the valve 42, thus admitting fluid pressure from the chamber 45 into the chamber 40, pressure fluid being supplied through pipe 47 and connection 46 to the chamber 45.

Pressure fluid flows from the chamber 40 through passage 85, connector 86 and pipe 87 directly to the slave motor 88, and pressure flowing into the chamber 103 (FIGURE 3) will move the pressure responsive unit 90 to the left to move the plunger 93 and thus displace fluid from the chamber 95 through lines 97 to the front wheel brakes 98.

Pressure fluid also flows from the line 87 through line 118 (FIGURE 1) into the pasage 151 (FIGURE 4). This fluid flows through the tubular member 154 into the chamber 134 to act downwardly on the diaphragm 131. The pressure fluid also flows from passage 151 into chamber 142, past the valve 149 and through port 148, chamber 146, port 147 and line 116 (FIGURES 1 and 2) into the motor chamber 115 to energize the master motor 10. Thus the pressure responsive unit 18 will move to the left in FIGURE 2 to operate the plunger 13 and displace fluid through lines 14 into the rear brake cylinders 15.

The initial "cracking" of the valve 42 admits pressure into the chamber 40, as previously stated. Pressure in this chamber acting against the adjacent face of the head 56 provides a first stage of pedal reaction by opposing movement of the members 55 and 56 to the left in FIGURE 2, thus providing the brake with "feel" upon initial energization of the motors 10 and 88. The reaction, while relatively light, will be proportional to the degree of energization of the two motors, as will be apparent.

During initial energization of the motors as described above, the diaphragm 57 will be maintained in engagement with the portion 41 of the nut 35 since the spring 59 during such time is sufficient to overcome pressure in the chambers 40 and 58. Upon initial contact of the brake shoes with the brake drums, there will be increased resistance to movement of the master cylinder plungers 13 and 93, whereupon there will occur an increase in pressure in the chambers 40 and 58. This pressure overcomes the spring 59 to compress such spring, whereupon the pressure to the left of the diaphragm 57 adds a second stage of reaction opposing pedal operation during the remainder of the brake application.

When the motor 10 becomes energized to its maximum extent, the operator can apply pedal forces to assist this motor in applying forces to the master cylinder plunger 13. Under such conditions, the cap member 56 will have its outer flange moved solidly into engagement with the adjacent portion of the nut 35 for the direct transmission of forces through the pressure responsive unit 18 and axial extension 20 to the plunger 13. Thus for heavy brake applications, the plunger 13 is subjected to both motor and pedal generated forces, and the total force will depend on the force applied by the driver to the brake pedal.

As previously stated, the present mechanism is particularly adapted for use on heavy vehicles such as trucks, which carry different loads, and the operating conditions referred to are intended to take place when the vehicle is heavily loaded, thus providing for maximum application of the rear brakes. The slave motor 88 is designed to have ample capacity in itself, without the application of pedal forces, to provide adequate braking at the front wheels of the vehicle. With the parts of the auxiliary valve mechanism positioned as shown in FIGURE 4, the full pressure supplied to the motor chamber 40 (FIGURE 2) will be supplied through the auxiliary valve mechanism to the motor 10. It will be noted that the diaphragms 131 and 132 are preferably of the same size, and under the conditions described, will be subjected to fluid pressures which balance each other, the fulcrum block 165 being arranged coaxially with the diaphragms 131 and 132 for the direct transmission of forces between the two diaphragms. The spring 135 provides a net force acting downwardly, thus maintaining the valve 149 open for the full application of pressures to the master motor 10.

The parts obviously return to normal positions when the brake pedal is released. The spring 60 moves the cap member 56 and associated elements to the right, allowing the pressure valve 42 to seat and to open the valve 43, thus cutting off the admission of pressure to the chamber 40 and opening such chamber to the atmosphere as previously described. Thus the pipe 87 will be vented to the atmosphere, and the same is true of the pipes 116 and 118, and accordingly the motor chamber 115 (FIGURE 2) also will be reduced to atmospheric pressure. The motor return springs 21 and 105 will return the pressure responsive units of the two motors to their normal off positions.

Assuming that the vehicle is relatively lightly loaded, the operator will turn the knob 169 clockwise, thus moving the fulcrum block 165 to the left of the position shown in FIGURE 4. If the vehicle is entirely unloaded, the fulcrum block 165 will be moved to a position adjacent the free end of the lever 158, thus lengthening the lever arm of such lever and shortening the lever 159.

Under such conditions, with the valve 149 (FIGURE 4) open, the operation of the valve mechanism of the master motor will admit pressure to lines 87 and 118 as previously described, causing immediate operation of the slave motor for the application of the front brakes. Since the valve 149 (FIGURE 4) is normally open, there will be also an immediate supply of pressure fluid to the master motor chamber 115 for the prompt application of the rear brakes.

Under the conditions now being considered, the admission of pressure through lines 116 and 118 and the auxiliary valve mechanism 117 causes an increase in pressure in the chamber 146 while pressure also is supplied to the chamber 134 as previously described. However, the changing of the effective lengths of the levers 158 and 159 renders a substantially lower pressure in the chamber 146 effective for overcoming pressure in the chamber 134. Therefore, while an immediate initial application of the rear brakes takes place, an increase in pressure to a predetermined point substantially lower than the pressure in the line 118 will move the diaphragm 132 upwardly, whereupon the valve 149 closes to prevent the admission of any increased pressure in the chamber 115 of the master motor. Thus much lower braking pressures will be supplied to the rear wheels to minimize or eliminate the locking and sliding of the rear wheels.

Thus the present mechanism is highly efficient for providing reduced braking forces at the rear wheels when the vehicle is running light or carrying partial loads. The fulcrum block 165 can be adjusted to any point between the position shown in FIGURE 4 and a position in which it engages the lever 158 adjacent the free end thereof, this adjustment being provided through the manual operation of the knob 169 in accordance with the loads carried by the vehicle. If the rush of pressure fluid around the valve 149 takes place so as to increase pressure in the chamber 146 above the desired predetermined pressure, a slight upward movement of the diaphragm 132, after the valve 149 closes, will "crack" the seat 141 and thus vent the chamber 146 to the atmospheric chamber 126. Thus the braking pressure supplied to the master motor will be immediately reduced to the proper point.

Another substantial advantage of the mechanism lies in the fact that reaction transmitted to the brake pedal is not dependent on the adjustment of the valve mechanism in FIGURE 4. Regardless of the adjustment of such valve mechanism, a given operation of the brake pedal will increase pressure in the chambers 40 and 58 to a predetermined extent and the slave motor 88 will be actuated in accordance with such pressure. As in the operation previously described, pressure in the chamber 40, acting on the adjacent face of the cap member 56, will transmit initial reaction to the brake pedal, followed by the second and higher stage of reaction which takes place when pressure in the chambers 40 and 58 compresses the spring 59 to transmit pressure forces from the diaphragm 57 to the manually operated member 55 to oppose pedal movement. Thus, regardless of the adjustment of the auxiliary valve mechanism in FIGURE 4, a given brake pedal operation will always result in the transmission of a given reaction to the brake pedal. Thus the operator is conscious of no adjustment of the auxiliary valve mechanism when he depresses the pedal to operate the brakes.

Of course, when the fulcrum block 165 (FIGURE 4) is moved to the left of its position shown, a lower pressure will be supplied to the motor chamber 115 (FIGURE 2) and since the loads carried by the vehicle are relatively light, the lower pressure in the chamber 115 will effect a substantial operation of the master cylinder plunger 113. Thus the rear brakes will be substantially applied without the transmission of direct pedal forces between the members 56 and 35, but such direct transmission of pedal forces can be effected by the operator, if desired.

The rib 120 (FIGURE 2) has its right-hand end arranged to the left of the normal limit of movement of the portion of the body 19 longitudinally alined therewith. Accordingly, in any normal brake applications, no matter how heavy, the body 19 will not contact with the rib 120. In this connection, it is pointed out that bosses extend to the left of the body 19 for the tapping thereinto of the connectors 46 and 86. The left-hand limits of the outer portions of the body 19 between the bosses referred to are indicated in dotted lines near the top and bottom of the body 19. It is this portion of the body 19 which stops short of the rib 120 in a brake application.

If the fluid line 14 should rupture so that no pressure can be built up in the master cylinder 12, the body 19 will come into contact with the rib 120 to limit movement of the pressure responsive unit before the brake pedal strikes the toe board. Therefore, the pedal is provided with remaining movement during which the valve mechanism for the motor 10 can be operated to control the slave motor 88. Thus the breaking of the line 14 will not render both motors inoperative. Also, under the conditions stated, it will be apparent that a fully modulated action of the valve mechanism of the motor 10 is provided for, and reaction against the brake pedal is preserved.

If the hydraulic line 97 should rupture, no pressure will be built up in the chamber 95 (FIGURE 3), and the admission of fluid pressure into the motor chamber 103 will simply move the pressure responsive unit 90 to its limit of movement. This will not affect the operation of the master motor for applying the rear brakes, as will be apparent.

It is to be understood that the form of the invention shown and described is to be taken as a preferred example of the same and that various changes in the shape, size, and arrangement of the parts may be made as do not depart from the spirit of the invention or the scope of the appended claims.

I claim:
1. In a motor mechanism, a fluid pressure operated motor having a pressure responsive unit and a pressure chamber at one side thereof, a device to be operated connected to said pressure responsive unit, a control valve mechanism carried by said pressure responsive unit coaxial therewith and having a control chamber therein, said valve mechanism having connection with sources of relatively high and low pressures and normally connecting said control chamber to said low pressure source, pedal operable means directly connected to said valve mechanism coaxially of said motor to operate it to disconnect said control chamber from said source of low pressure and connect it to said source of high pressure, a fluid line connected at its ends respectively to said control chamber and said pressure chamber, adjustable means in said fluid line having a normally open valve therein to normally connect said control chamber and said pressure chamber and being adjustable to close said fluid line upon the building up of any predetermined pressure in said pressure chamber to limit energization of said motor, and a pressure responsive device carried by said pressure responsive unit and exposed to pressure in said control chamber and connected for transmitting to said pedal operable means reaction forces proportional to pressures in said control chamber.

2. The combination defined in claim 1 provided with means for transmitting pedal forces to said pressure responsive unit to assist said motor in operating said device to be operated.

3. A hydraulic brake mechanism comprising a pair of fluid pressure operated motors each having a pressure responsive unit and a pressure chamber at one side thereof, a master cylinder having a plunger connected to each pressure responsive unit and connected to one set of vehicle wheel cylinders, a control valve mechanism in one of said motors carried by the pressure responsive unit therein coaxially thereof, such pressure responsive unit having a control chamber, said valve mechanism having connection with sources of relatively high and low pressures and normally connecting said control chamber to said low pressure source, pedal operable means directly connected to said valve mechanism to operate it to disconnect said control chamber from said source of low pressure and connect it to said source of high pressure, separate fluid lines connecting said control chamber to said motor chambers, the separate fluid line connected to the other motor being open whereby pressure in said other motor will correspond to pressure in said control chamber, adjustable means in the fluid line connected to said one motor, said adjustable means having a normally open valve therein to normally connect said control chamber and said pressure chamber of said one motor and being adjustable to close such fluid line upon the building up of any predetermined pressure in such pressure chamber to limit energization of said one motor, and means exposed to pressure in said control chamber and connected to said valve mechanism for transmitting to said pedal operable means reaction forces proportional to pressures in said control chamber.

4. A hydraulic brake mechanism comprising a pair of fluid operated motors each having a pressure responsive unit and a pressure chamber at one side thereof, a master cylinder having a plunger connected to each pressure responsive unit and connected to one set of vehicle wheel cylinders, a control chamber in the pressure responsive unit of one of said motors, a valve mechanism coaxial with said pressure responsive unit connected to sources of relatively high and low pressures and normally connecting said source of low pressure to said control chamber, a rod projecting axially into said one motor and connected to said valve mechanism, pedal operable means directly connected to said rod to move it to operate said valve mechanism to disconnect said control chamber from said source of low pressure and connect it to said source of high pressure, separate lines connected between said control chamber and said motor chambers, adjustable means in the fluid line connected to said one motor, said adjustable means having a normally open valve therein to normally connect said control chamber to the pressure chamber of said one motor and being adjustable to close such fluid line upon the building up of any predetermined pressure in such pressure chamber to limit energization of said one motor, and means for transmitting pedal forces from said rod to pressure responsive unit of said one motor.

5. A mechanism according to claim 4 provided with means for transmitting to said pedal operable means reaction forces proportional to pressures in said control chamber.

References Cited in the file of this patent
UNITED STATES PATENTS

| | | |
|---|---|---|
| 1,872,659 | Bragg et al. | Aug. 23, 1932 |
| 1,946,127 | Bragg et al. | Feb. 6, 1934 |
| 2,033,842 | McFarland | Mar. 10, 1936 |
| 2,170,086 | McCune | Aug. 22, 1939 |
| 2,313,991 | Fitch | Mar. 16, 1943 |
| 2,366,608 | Freeman | Jan. 2, 1945 |
| 2,568,900 | Rockwell | Sept. 25, 1951 |
| 2,642,165 | Banker | June 16, 1953 |
| 2,862,365 | Ingres et al. | Dec. 2, 1958 |